Dec. 4, 1951     C. J. BURKLAND     2,577,675
MECHANICAL MOVEMENT
Filed Sept. 23, 1948
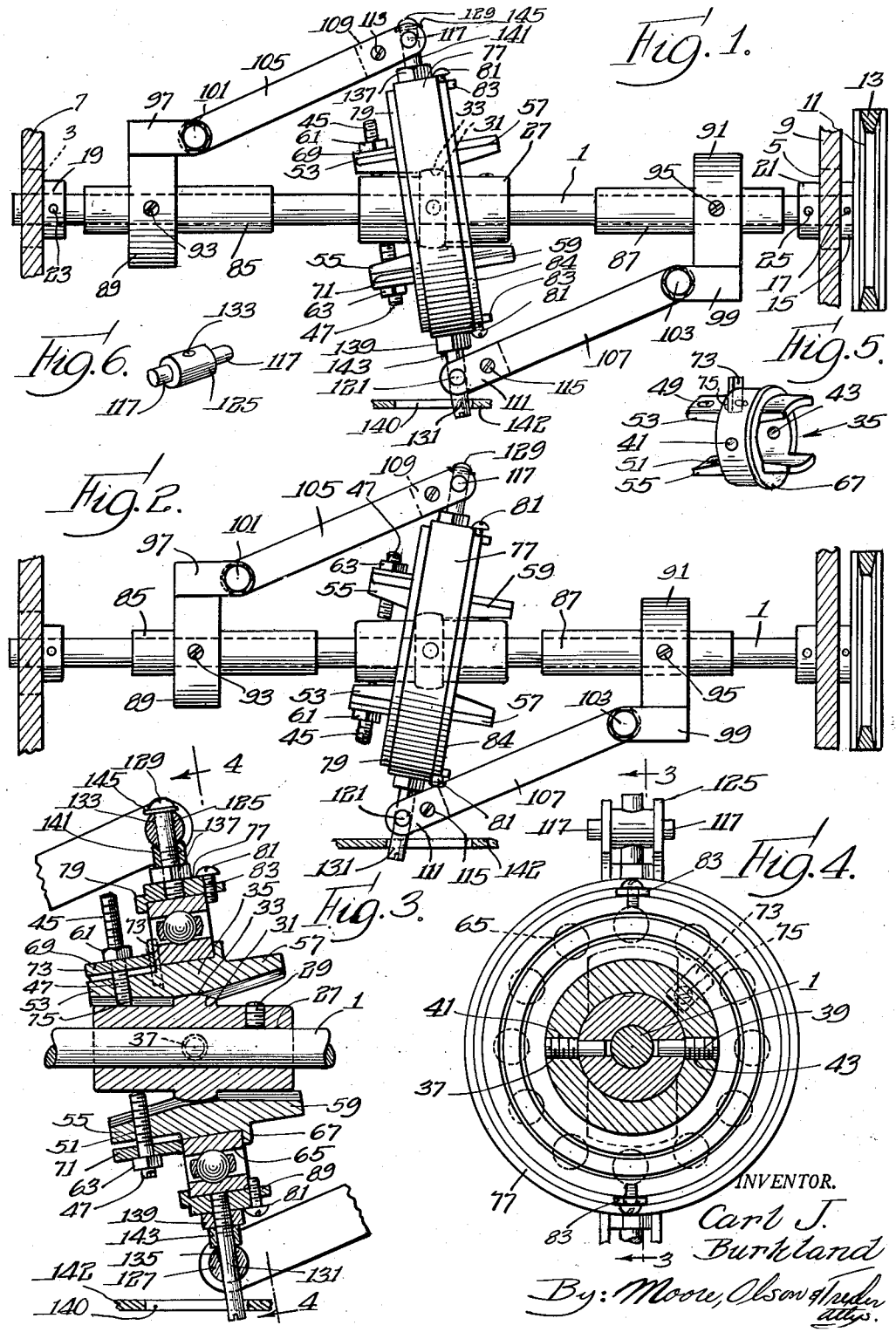
INVENTOR.
Carl J. Burkland
By: Moore, Olson & Trexler
attys.

Patented Dec. 4, 1951

2,577,675

UNITED STATES PATENT OFFICE 2,577,675

MECHANICAL MOVEMENT

Carl J. Burkland, Chicago, Ill., assignor of one-half to Earl Haubrich, Chicago, Ill.

Application September 23, 1948, Serial No. 50,795

11 Claims. (Cl. 74—60)

The present invention relates to a new apparatus or mechanism for converting simple rotary motion to high speed nutating motion. From this nutating motion can be derived a simple oscillating or reciprocating motion or a combination of those motions.

Previously, mechanisms such as cranks, disc cams, pawls, and endless chains have been used for converting rotary to oscillating or reciprocating motion perpendicular to the drive shaft. In each of these there is a dead center position where the motion reverses. A side thrust is thus delivered to the main bearings producing wear and causing vibration throughout the mechanism.

In many applications, it is imperative that the driven parts whether partaking of a nutating, oscillating, or reciprocating motion should operate over readily adjustable angles or distances, and without vibration. None of the above mentioned apparatus meets this requirement.

Various devices for converting rotary to reciprocating motion parallel to the drive shaft involving spiral cams or worm gears having both left and right hand tracks or screws have been tried, but these have a definite stop at each end where the mechanism tends to stick. Furthermore, the reciprocating motion has been slow, and excessive vibration, friction and wear have been ever present. These devices also have no provision for varying the distance over which the reciprocating parts operate.

Accordingly, an object of this invention is to provide an apparatus or mechanism for converting rotary motion to rapid, adjustable nutating, oscillating or reciprocating motion with a minimum of vibration and wear.

A further object of this invention is to provide an apparatus or mechanism for converting rotary to rapid reciprocating motion in which the reciprocating distance can be readily varied.

A still further object of this invention is to provide an apparatus for converting rotary motion into a plurality of opposed reciprocating motions imparting no end thrust to the main bearings of the drive-shaft.

The present invention contemplates the mounting of a sleeve on the drive-shaft in such a manner that its geometric axis may be tilted or skewed at any adjusted or selected angle with respect to the axis of the drive-shaft and adjustably fixed in the selected position and thus cause a ring or sleeve rotatably mounted on the tiltable sleeve to tilt as the drive-shaft rotates and thereby produce a selected range of nutating motion with a minimum of vibration.

Still further objects of the present invention will become apparent with reference to the following description and the accompanying drawings in which:

Fig. 1 is a top view of the apparatus with the parts shown at the extremity of a stroke;

Fig. 2 is a top view of the apparatus showing the parts at the opposite extremities of a stroke following a half revolution of the drive shaft;

Fig. 3 is a sectional view of the converter mechanism substantially taken along line 3—3 of Fig. 4;

Fig. 4 is an end view partly in section of the converter mechanism taken substantially along line 4—4 of Fig. 3;

Fig. 5 is a perspective view of the tiltable sleeve; and

Fig. 6 is a perspective view of the swivel joint holding the connecting arms.

The drive shaft 1 is journaled in roller bearings 3 and 5 set in suitable supports 7 and 9 shown as fragmentary sections. A pulley 11 is driven by a belt 13 shown in section only. The pulley 11 has a collar 15 formed integral with it and a set screw 17 in this collar holds the pulley 11 firmly on the shaft 1. The pulley is driven through the medium of the belt by any suitable source of power (not shown) and in turn drives the drive shaft. Axial motion of the drive shaft 1 is prevented by the collars 19 and 21 fixed to it near its extremities by set screws 23 and 25.

At a convenient point along the drive-shaft 1 is a sleeve 27 secured to the shaft 1 by a set screw 29 or suitable key. At the center of the sleeve 27 is a raised annular portion 31 comprising a spherical segment and engaging a cooperative bearing surface 33 of a sleeve 35 which tilts about the trunnions 37 and 39 which are threaded into holes 41 and 43 in the sleeve 35. The axis of the sleeve 35 is tilted or skewed and held at any selected or adjusted angle with regard to the axis of the drive shaft 1 by means of adjusting screws 45 and 47 which are threaded into holes 49 and 51 in extending portions 53 and 55 of the sleeve 35. Like portions 57 and 59 extending in the opposite direction have no holes or adjusting screws, but aid in keeping sleeve 35 from being tilted too far and serve as counterweights to impart proper dynamic balance to the sleeve 35. The screws 45 and 47 hold the sleeve in whatever position is selected by bearing on the sleeve 27. The screws 45 and 47 are held in proper place by jam nuts 61 and 63. A standard ball bearing assemblage 65 of the common radial and thrust type is held on the sleeve 35 by an annular flange 67 formed integral with the sleeve 35 and by a pair of shoulders 69 and 71 held on extending portions 53 and 55 respectively by adjusting screws 45 and 47 and nuts 61 and 63. A key 73 is held in a slot on one side of the center portion of the sleeve 35 by a screw 75 and cooperates with a slot in the side of the innermost bearing race to prevent relative rotation of the sleeve and bearing race. It may be desirable to counterbalance this for high speed operation. A concentric ring, sleeve or collar 77 is fitted on the outside of the ball bearing assemblage 65 and is prevented from moving axially relative to the bearing, by a flange 79 integral with one side of the ring 77 and a plurality of screws 81 threaded into shoulders 83 extending from a flange 84 formed on the ring 77 opposite the flange 79.

Slidable sleeves 85 and 87 fit on the drive shaft 1 where they are disposed on opposite sides of the sleeve 27. Collars 89 and 91 fit respectively on slidable sleeves 85 and 87 and are held in adjustable position thereon by set screws 93 and 95 respectively. Affixed to or formed integral with collars 89 and 91 are brackets 97 and 99 which are each bifurcated at the end nearest the sleeve 27. Bolts or pins 101 and 103 respectively hold bifurcated connecting arms 105 and 107 pivotally within the bifurcated brackets 97 and 99. The lower bifurcated portions 109 and 111 of the arms 105 and 107 are removable and are respectively fixed to the main parts of the arms by screws 113 and 115, which are threaded into the removable bifurcated portions 109 and 111. The bifurcated portions of the arms pivot on the ends 117 and 121 of the respective swivel joints 125 and 127. Pivot screws 129 and 131 pass through radial holes 133 and 135 in the swivel joints 125 and 127 and are threaded into the ring 77 and abut against the outer portion of the ball bearing assemblage 65, thus serving both to transmit power from the ring 77 to the connecting arms 105 and 107 and to prevent relative rotation between the ball bearing assemblage 65 and the ring 77. The pivot screw 131 extends outwardly through a guide slot 140 in a stationary wall, casing or plate 142 to prevent rotation of the ring 77. Jam nuts 137 and 139 hold the screws in a set position. Collars 141 and 143 and washers 145 and 147 prevent the swivel joints 125 and 127 from sliding axially on the screws 129 and 131.

*Operation*

In Fig. 1 the parts are shown at one extremity of a stroke. As the sleeve 27 rotates with the drive shaft 1 the tiltable sleeve 35 and the inner race of the ball bearing assemblage 65 nutate or wobble and rotate therewith. This causes the outer race of the ball bearing assemblage 65 and the outer ring 77 to experience a nutating or wobble motion, the ring being held against rotation with the sleeve 27 and the inner bearing ring. Near the middle of a stroke the major component of this motion is one of rotation or revolution about a substantially vertical axis, i. e., the trunnions 37 and 39. The parts are shown in Fig. 2 following a half revolution of the drive shaft. At this point as well as at the other extremity of motion about a vertical the moving parts do not come to a sudden stop, but continue to move slowly thereby avoiding vibration. The major component of the motion of the outer ball bearing race and the ring 77 is now one of rotation or revolution about a substantially horizontal axis, the parts tilting very rapidly about the axis of the screws 129 and 131. Figs. 1 and 2 each show the parts at midpoint of one of these tilting movements about a horizontal axis.

In moving to the position of Fig. 2 from the position of Fig. 1 the screws 129 and swivel joint 125 are moved to the right, pulling the arm 105 with them. Similarly the screw 131 and swivel joint 127 are moved to the left pulling the arm 107 with them. As the connecting rod 105 moved to the right it pulled the collar 89 to the right and thus slid the sleeve 85 to the right along the drive shaft. In the same way connecting arm 107 moved the sleeve 87 to the left. Whatever objects or parts are to be reciprocated can be connected to the collars 89 and 91 or the sleeves 85 and 87. As the sleeves 85 and 87 are at all times being moved in opposite directions there will be no end thrust on the main bearings 3 and 5. The sleeve 35 may be micrometrically adjusted to selected angles of inclination relative to the sleeve 27 or shaft 1, by means of screws 45 and 47 to selectively, or adjustably, predetermine the angular component of swing of the bearing 65 or ring 77. This adjustment, as will be evident, will also serve to predetermine the extent of oscillation or the distance of reciprocation of any part connected to, or driven by, the nutating ring 77.

It will be evident from the foregoing description that the invention here presented provides a new apparatus or mechanism for converting simple rotary motion to rapid nutating, oscillating, or reciprocating motion of predetermined adjustable extent or distance.

Although one specific embodiment of the present invention has been shown and described it is to be understood that further modifications may be made without departing from the spirit and scope of the appended claims.

I claim:

1. A mechanical movement comprising a rotary drive member, a raised annular bearing surface on said drive member, a sleeve tiltably mounted on said drive member over said bearing surface, and secured to said member to nutate and rotate on rotation of said member, the axes of said sleeve and said drive member being relatively inclined, means for adjusting the relative inclination, said adjusting means including means for exerting a force between said sleeve and said drive member substantially transversely of said drive member, a second member journaled on said sleeve, means connecting said sleeve and said second member for nutating said second member, and means for preventing rotation of said second member with said sleeve.

2. A mechanical movement comprising a rotatable member, a bearing surface on said rotatable member, said bearing surface being curved axially of said rotatable member, a sleeve mounted on said member and bearing on said bearing surface, and with the axis of said sleeve tilted relative to the axis of rotation of said member, means for adjusting the degree of tilt, said adjusting means including substantially opposed members for exerting a force between said rotatable member and said sleeve substantially transversely of said rotatable member, said sleeve being secured to said member to nutate and rotate on rotation of said member, a second member journaled on said sleeve, a third member mounted for to and fro movement in a single plane, and means connecting said third member to said second member for moving said third member to and fro on nutation, without rotation, of said second member.

3. An apparatus for converting rotary to to and fro motion comprising a drive shaft, a sleeve mounted on said drive shaft, the axes of said sleeve and said drive shaft being relatively skewed, means for varying the angle of skew about an axis transverse to said drive shaft and fixed relative thereto, said means including means for exerting a force between said drive shaft and said sleeve substantially transversely of said drive shaft, a ring so mounted on said sleeve as to allow relative rotation therebetween, a swivel joint on said ring, a connecting arm connected to said swivel joint and being moved thereby, and a member driven to and fro by said connecting arm.

4. An apparatus as described in claim 3 in which the member movable to and fro comprises a sleeve slidably mounted on and carried solely by said drive shaft.

5. An apparatus for converting rotary to reciprocating motion, said apparatus comprising a drive shaft, a sleeve mounted on said drive shaft, the axes of said sleeve and said drive shaft being relatively skewed, adjustable means for exerting a substantially radial force between said sleeve and said drive shaft to vary the angle of skew, a ring so mounted on said sleeve as to allow relative rotation therebetween, a plurality of swivel joints mounted on said ring, a plurality of connecting arms respectively connected to said swivel joints and being moved thereby and a plurality of reciprocating members driven by said connecting arms.

6. An apparatus as described in claim 5 in which the reciprocating members comprise sleeves slidably mounted on and carried solely by said drive shaft.

7. An apparatus for converting rotary motion to a plurality of reciprocating motions imparting no axial thrust or sudden radial thrust to the main bearings, said apparatus comprising a drive shaft, a sleeve mounted on said drive shaft and bifurcated at one end to provide a plurality of tongues, the axes of said sleeve and said drive shaft being relatively skewed, means for exerting a variable force between one of said tongues and said drive shaft to vary the angle of skew, a plurality of reciprocable members, and means connecting said sleeve and said reciprocable members for reciprocating said reciprocable members.

8. An apparatus for converting rotary to reciprocating motion comprising a drive shaft, a raised annular bearing surface comprising a spherical segment, a sleeve so mounted on said drive shaft and bearing on said bearing surface that the axis of said sleeve may be adjustably skewed relative to the axis of the drive shaft through a substantial angle, means including an element carried by said sleeve for exerting a substantially radial force between said sleeve and said drive shaft to adjust the angle of skew therebetween, a ring so mounted on said sleeve as to allow relative motion therebetween, a reciprocable member and means connecting said ring and said reciprocable member for transmitting motion therebetween.

9. An apparatus as described in claim 8 in which the sleeve is adjustably skewed by means of a plurality of adjusting screws bearing on the drive shaft and locking nuts.

10. An apparatus for converting rotary to nutating motion, said apparatus comprising a first sleeve, a second sleeve mounted on said drive shaft so as to be tiltably adjustable, opposed screw means between said sleeves to effect the tilting adjustment, a ball bearing assemblage mounted on said sleeve, the inner race of said ball bearing assemblage being fixed in position relative to said sleeve, a third sleeve on said bearing, the outer race being fixed to said third sleeve, and means for causing relative rotation between the first and third sleeves.

11. A mechanical movement comprising a first sleeve, an annular bearing surface comprising a spherical segment on said first sleeve, a second sleeve pivotally mounted on said first sleeve for angular adjustment about a pivot axis transverse to the axis of the first sleeve, a bearing surface on said second sleeve complementary to said annular bearing surface and bearing thereon, and of substantially lesser extent than said annular bearing surface longitudinally of said first sleeve, means for adjustably fixing said second sleeve at a selected angle to the first sleeve, said last named means including an adjustable member carried by one of said sleeves for exerting a substantially radial force between said first and second sleeves, a third sleeve journaled on the second sleeve, and means for causing relative rotation between the third sleeve and the other sleeves.

CARL J. BURKLAND.

REFERENCES CITED

The following references are of record in the file of this patent:

UNITED STATES PATENTS

| Number | Name | Date |
|---|---|---|
| 155,943 | Hamilton | Oct. 13, 1874 |
| 256,434 | Hurd | Apr. 11, 1882 |
| 1,346,672 | Patton | July 13, 1920 |
| 1,799,167 | Hulsebos | Apr. 7, 1931 |
| 2,193,503 | Wahlmark | Mar. 12, 1940 |
| 2,247,527 | Stinnes | July 1, 1941 |
| 2,316,394 | Bovee | Apr. 13, 1943 |

FOREIGN PATENTS

| Number | Country | Date |
|---|---|---|
| 561,893 | Great Britain | June 9, 1944 |